US010279911B2

(12) United States Patent
Murphy et al.

(10) Patent No.: US 10,279,911 B2
(45) Date of Patent: May 7, 2019

(54) SYSTEM AND METHOD FOR STORING AND SEQUENCING LUGGAGE ITEMS

(71) Applicants: Christopher Murphy, Ann Arbor, MI (US); Robertus A. Schmit, West Bloomfield, MI (US); Michael Fleming, Brighton, MI (US)

(72) Inventors: Christopher Murphy, Ann Arbor, MI (US); Robertus A. Schmit, West Bloomfield, MI (US); Michael Fleming, Brighton, MI (US)

(73) Assignees: Jervis B. Webb Company, Novi, MI (US); Daifuku Co., Ltd., Osaka (JP)

( * ) Notice: Subject to any disclaimer, the term of this patent is extended or adjusted under 35 U.S.C. 154(b) by 222 days.

(21) Appl. No.: 15/289,786

(22) Filed: Oct. 10, 2016

(65) Prior Publication Data
US 2018/0099751 A1    Apr. 12, 2018

(51) Int. Cl.
*B65G 11/00*    (2006.01)
*B64D 11/00*    (2006.01)
(Continued)

(52) U.S. Cl.
CPC .............. *B64D 11/003* (2013.01); *B65G 1/10* (2013.01); *G05D 1/021* (2013.01); *G05D 2201/0216* (2013.01)

(58) Field of Classification Search
USPC ........................................................ 700/214
See application file for complete search history.

(56) References Cited

U.S. PATENT DOCUMENTS

| 4,954,038 A | 9/1990 | Sheahan |
| 5,092,450 A | 3/1992 | Schommartz et al. |
| (Continued) | | |

FOREIGN PATENT DOCUMENTS

| CN | 101031792 A | 9/2007 |
| CN | 103183212 A | 7/2013 |
| (Continued) | | |

OTHER PUBLICATIONS

Potera, Carol; Automation Pioneer Enters Life Sciences; Genetic Engineering & Biotechnology News; Aug. 1, 2012; vol. 32, No. 14.

*Primary Examiner* — Kyle O Logan
(74) *Attorney, Agent, or Firm* — Dickinson Wright PLLC

(57) ABSTRACT

A system and method for storing and sequencing a plurality of luggage items. The system includes containers with vertically stacked shelves and an automatic guided vehicle releasably attachable to the containers for transporting a container between a first predetermined area and a loading area with a loading assembly to move a luggage item from an entrance conveyor onto one of the shelves of the container. The containers may include wheels for being manually moved. A transport vehicle is provided for moving a plurality of containers together. The method includes determining a grouping criterion of the luggage item and sorting and sequencing luggage items onto containers according to the grouping criterion. Different embodiments of the loading assembly are provided with one using a packing automated vehicle and another using stacked platform conveyors. Several grouping criteria are provided which may depend on processing requirements of the luggage items.

25 Claims, 12 Drawing Sheets

(51) Int. Cl.
*G05D 1/02* (2006.01)
*B65G 1/10* (2006.01)

(56) References Cited

U.S. PATENT DOCUMENTS

| | | |
|---|---|---|
| 5,190,428 A | 3/1993 | Bryant et al. |
| 5,385,243 A | 1/1995 | Jackson et al. |
| 6,349,237 B1 | 2/2002 | Koren et al. |
| 6,675,946 B2 | 1/2004 | Lutz |
| 6,937,692 B2 | 8/2005 | Johnson et al. |
| 7,012,256 B1 | 3/2006 | Roos et al. |
| 7,270,227 B2 | 9/2007 | Bender et al. |
| 7,343,995 B2 | 3/2008 | Fukuhara et al. |
| 7,490,710 B1 | 2/2009 | Weskamp et al. |
| 7,561,664 B2 | 7/2009 | Teslyar et al. |
| 7,577,234 B2 | 8/2009 | Roe et al. |
| 7,686,154 B2 | 3/2010 | Henkel et al. |
| 7,815,036 B2 | 10/2010 | Spangler et al. |
| 7,894,932 B2 | 2/2011 | Mountz et al. |
| 8,474,595 B2 | 7/2013 | Crass et al. |
| 8,561,290 B2 | 10/2013 | Yamashita et al. |
| 8,678,169 B2 | 3/2014 | Baker et al. |
| 8,731,137 B2 | 5/2014 | Arroyo, Jr. et al. |
| 8,899,404 B2 | 12/2014 | Schoepe et al. |
| 8,939,076 B2 | 1/2015 | Doyle |
| 9,074,984 B2 | 7/2015 | Padgett et al. |
| 2003/0128806 A1 | 7/2003 | Morrell |
| 2007/0029165 A1 | 2/2007 | Bender et al. |
| 2007/0083414 A1 | 4/2007 | Krohn |
| 2007/0217571 A1 | 9/2007 | Teslyar et al. |
| 2007/0280502 A1 | 12/2007 | Paresi et al. |
| 2010/0254511 A1 | 10/2010 | Panesar et al. |
| 2014/0228999 A1* | 8/2014 | D'Andrea ............... B66F 9/063 700/214 |
| 2014/0277698 A1 | 9/2014 | Combs et al. |
| 2016/0244184 A1 | 8/2016 | Alderman et al. |
| 2018/0009550 A1* | 1/2018 | Thogersen .............. B64F 1/368 |

FOREIGN PATENT DOCUMENTS

| | | |
|---|---|---|
| CN | 203544989 U | 4/2014 |
| CN | 103183212 B | 4/2015 |
| DE | 1481069 A1 | 10/1969 |
| DE | 102009048770 A1 | 4/2011 |
| WO | 2006015381 A2 | 2/2006 |

* cited by examiner

SYSTEM AND METHOD FOR STORING AND SEQUENCING LUGGAGE ITEMS

BACKGROUND OF THE INVENTION

1. Field of the Invention

A system and method for storing and sequencing a plurality of luggage items. More specifically a system and method for automatically storing, and sequencing luggage items according to an associated grouping criterion.

2. Discussion

When passengers travel via commercial conveyance methods such as on airliners, the conveyance company often allows the passengers to check their luggage items. The conveyance company and their agents, collect, process, transport, and return to the passenger the checked luggage items upon arrival at the final passenger's final destination.

During processing of the luggage items by the conveyance company, it is often advantageous to group luggage items together based on a grouping criterion, such as a group of passengers traveling together on a shared reservation. Any processing or processing changes due to events such as connections made or missed are generally applicable to all passengers on a shared reservation and therefore routing or storage of the associated luggage can be simplified by grouping that luggage together. Furthermore, luggage items which are sorted and grouped together at one location or step of a trip may be kept together and routed accordingly at subsequent locations, which may save the time and effort that would otherwise be required to sort and identify those luggage items multiple times at each of the subsequent locations.

In the current state of the art, stored luggage is managed a number of ways. For example, the stored luggage items may be manually stored in an area designated for holding or storing. Such manual handling methods tend to be labor intensive, prone to worker injury, and prone to manual miss-handling error. For trips having one or more intermediate destinations with changes in conveyances, or stopover locations, luggage is commonly unloaded and resorted at each intermediate destination along the route in addition to an initial sorting at the departure location and a final sorting at the final destination.

According to another example method, stored luggage items may be sorted to, and accumulated on, long sections of belt conveyor. Each section of belt conveyor may hold a group of luggage items that have common attributes such as flight number or departure time window.

Certain issues associated with conveyor processing and storage systems of the prior art have been recognized. For example, such systems require substantial floor space and capital investment. Furthermore, the handling of stored bags in large groups obviates the possibility of processing individual bags or smaller groups of bags. Such handling may be necessary when a passenger changes itinerary or when a flight schedule changes unexpectedly. When these events happen, the entire group, or entire belt section, must be re-sorted to separate the desired luggage item(s) from the group. These handling constraints impair the flexibility of these systems.

In view of the foregoing, there remains a need for improvements to systems and methods for storing and sequencing luggage items.

SUMMARY OF THE INVENTION

A system for storing and sequencing a plurality of luggage items is provided. The system includes at least one container having a plurality of shelves vertically stacked on top of one another and supported by a first chassis. The system also includes one or more automatic guided vehicles for transporting the containers and/or luggage items and which may also load the luggage items onto the containers. The system includes an entrance conveyor positioned in the loading area and delivers luggage items into the loading area. A first predetermined area is spaced apart from the loading area with a first pathway extending therebetween. The system also includes at least one carrier automatic guided vehicle releasably attachable to the container for transporting the container between the loading area and the first predetermined area and a loading assembly to move the luggage item from the entrance conveyor onto one of the shelves of the container. A control system may be connected to the loading assembly for instructing the loading assembly to move the luggage item from the entrance conveyor onto one of the shelves of the container. The control system may also be wirelessly connected to the carrier automatic guided vehicle for controlling the movement of the carrier automatic guided vehicle along the first pathway.

A method for storing and sequencing a plurality of luggage items is also provided. The method includes receiving at least one of the luggage items into a loading area from an entrance conveyor; determining a grouping criterion of the luggage item; and providing a plurality of containers each including a plurality of shelves vertically stacked on top of one another. The method also includes sorting the luggage items through the steps of determining by the control system if any of the containers is associated with the grouping criterion of the luggage item and is an available container being in a location proximate to the loading area and having at least one available shelf with capacity to hold the luggage item, and designating by the control system such a container as a preferred container, and if no such container exists then designating by the control system an available container not associated with the grouping criterion of the luggage item as a preferred container. The method proceeds with the steps of attaching a carrier automatic guided vehicle to the preferred container; loading the luggage item from the entrance conveyor onto an available shelf of the preferred container; and moving the container with the luggage item by the carrier automatic guided vehicle to a first predetermined area. The method steps do not necessarily need to be performed in the order listed. For example, the step of attaching a carrier automatic guided vehicle to the preferred container may be performed either before, after, or during the step of loading the luggage item from the entrance conveyor onto an available shelf of the preferred container.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Referring to the Figures, wherein like numerals indicate corresponding parts throughout the several views, a system and method for storing and sequencing a plurality of luggage items 20 is provided. The example embodiments demonstrate how the subject system and method may be utilized to store and sequence checked-in luggage items 20 in an airport. However, it should be appreciated that the subject system and method can be utilized to store and sequence luggage items 20 in other transportation hubs including, but not limited to, train stations, bus stations and marinas.

Figure 3A:
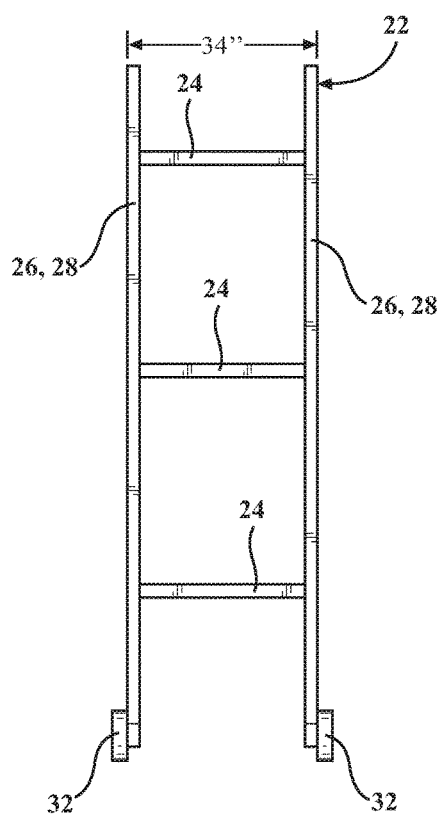
FIG. 3A is a side view of a container in accordance with an aspect of the disclosure.
Figure 3B:
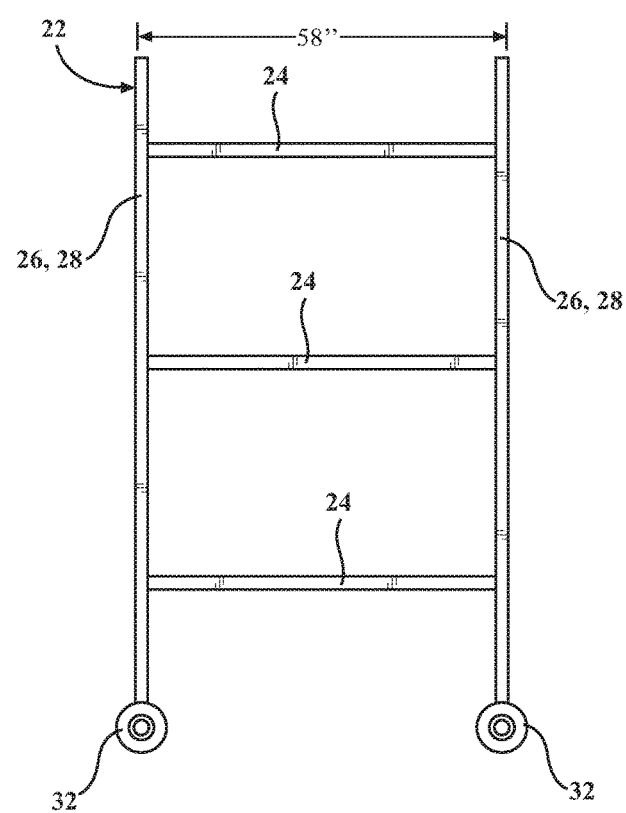
FIG. 3B is a front view of the container of FIG. 3A.
Figure 5:
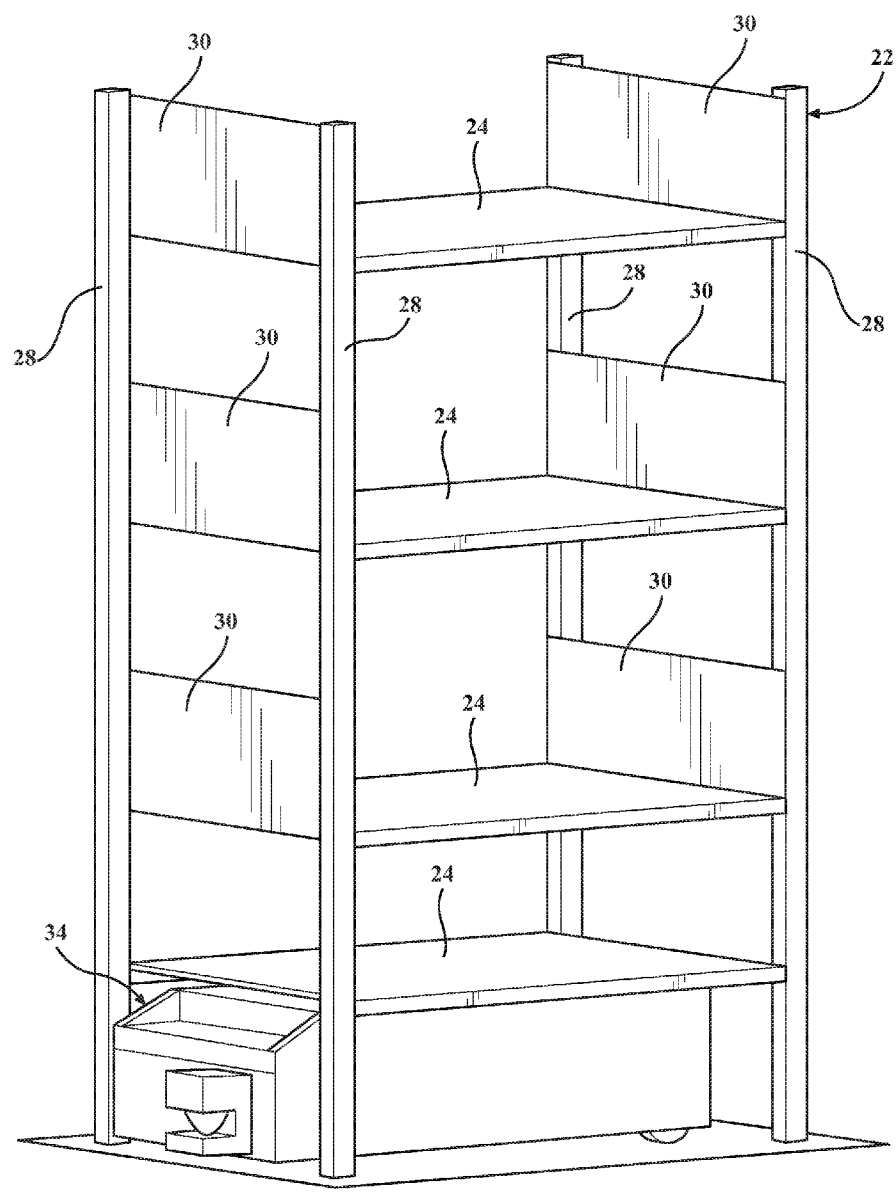
FIG. 5 is a perspective view of another carrier automatic guided vehicle of in position under another container in accordance with an aspect of the disclosure.

With reference to FIGS. 3A and 3B, the system includes at least one container 22 including a plurality of shelves 24 vertically stacked on top of one another and supported by a first chassis 26. The container 22 may be sized and configured to hold one or more standard sized luggage items 20 on each shelf 24. Standard sized luggage items 20 may include, for example, suit cases, carry-on type bags or other similarly sized bags. The shelves 24 may, for example, be 58" wide by 34" deep. Other container configurations may also be used, such as ones designed to accommodate oversize luggage items such as golf bags or skis or snowboards. As shown in FIG. 5, the first chassis 26 of the container 22 may include four upright posts 28 holding the shelves 24 in position and with an end panel 30 disposed on an opposite end of each shelf 24. The end panels 30 may provide structural rigidity to the containers 22 and may help to hold luggage items 20 in place on the shelves 24 when the containers 22 are being moved. One or more of the containers 22 may include a plurality of first wheels 32 so the containers 22 may be manually moved, such as by rolling without an automatic guided vehicle attached thereto. At least one pair of the first wheels 32 may be pivotable, such as with a swivel caster, to aid in turning the container 22. At least one of the first wheels 32 may include a brake lock to prevent the container 22 from unintentionally moving, such as rolling on a pitched surface or being inadvertently pushed, such as by wind or jetwash. The containers 22 may also include other features such as a handle to aid in manual movement.

The system also includes one or more automatic guided vehicles 34, 36 for transporting the containers 22 and/or luggage items 20 and which may also load the luggage items 20 onto the containers 22. It should be appreciated that other types of material handling devices 38, 40, e.g., conveyors, belts, and human driven vehicles, may be utilized in certain operations of the system. As will be discussed in greater detail below, each of the automatic guided vehicles 34, 36 are programmed to automatically, i.e., without a human driver, to move through the loading area 42 based on instructions provided by a control system 44. It should be appreciated that any number of automatic guided vehicles 34, 36 could be utilized and it is advantageously easy to add and remove automatic guided vehicles 34, 36 to/from the loading area 42. It should also be appreciated that the containers 22 may be moved and loaded/unloaded manually as needed.

Figure 2:
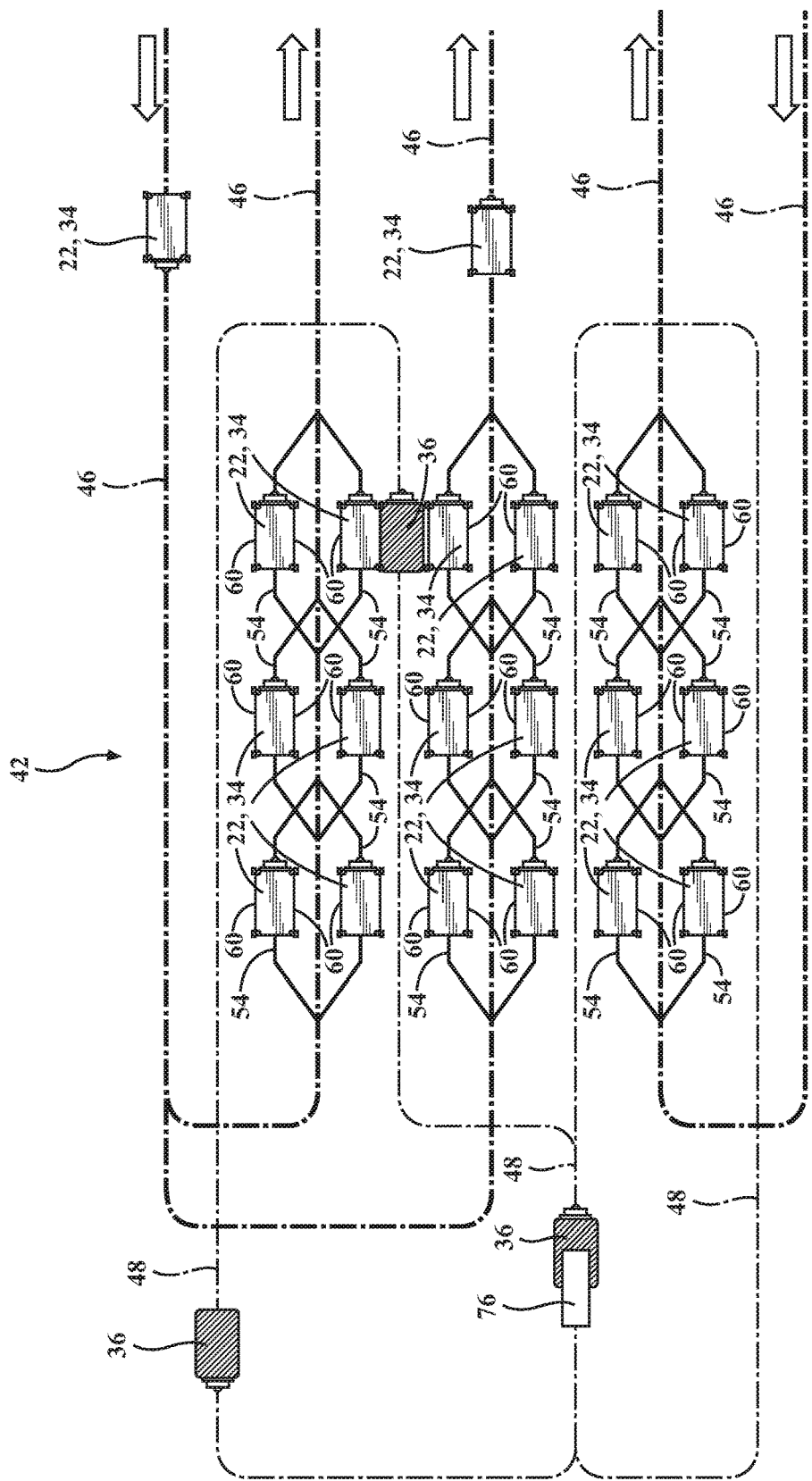
FIG. 2 a top view of a first example embodiment of a loading area according to an aspect of the disclosure.

As shown in FIG. 2, a series of pathways 46, 48 are disposed on the ground of the loading area 42 on which the automatic guided vehicles 34, 36 are configured to follow based on instructions provided by the control system 44. The pathways 46, 48 include numerous segments that extend to different parts of the loading area 42 and which may extend outside of the loading area 42 to other predetermined areas 50, 52. The other predetermined areas 50, 52 may include, for example, a storage area, an inspection station, and an unloading area. The pathways 46, 48 may include designated handoff locations 54 where the luggage items 20 may be transferred to the containers 22. The pathways 46, 48 may take various forms including, but not limited to, magnetic markers or wires on the floor. Further, the pathways 46, 48 may be electronically mapped into software of the control system 44 such that the automatic guided vehicle may be programmed to automatically move along programed segments of the pathways 46, 48 via coordinate mapping using GPS or other technologies.

Figure 1:
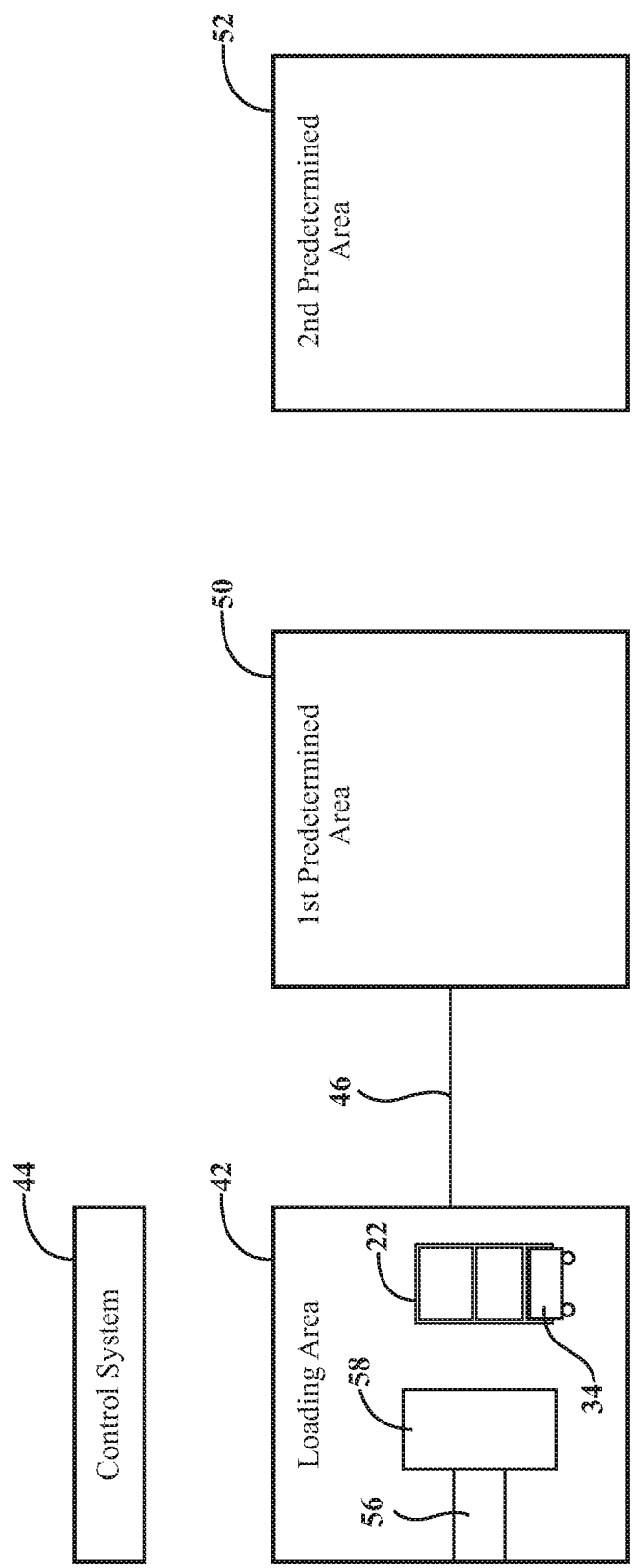
FIG. 1 is a block diagram showing the main areas and components of the system.

As shown in FIGS. 1 and 2, the system includes an entrance conveyor 56 positioned in the loading area 42 which delivers luggage items 20 into the loading area 42. In the example embodiments, the entrance conveyor 56 is a belt-style conveyor which ultimately extends from a check-in area of the airport. As such, the entrance conveyor 56 delivers baggage items into the loading area 42 that have been checked-in by passengers. It should be appreciated that the entrance conveyor 56 may receive luggage items 20 from other locations. A first predetermined area 50 is spaced apart from the loading area 42 with a first pathway 46 extending between the loading area 42 and the first predetermined area 50. The system also includes at least one carrier automatic guided vehicle 34 releasably attachable to the container 22 for transporting the container 22 between the loading area 42 and the first predetermined area 50 and a loading assembly 58 to move the luggage item 20 from the entrance conveyor 56 onto one of the shelves 24 of the container 22. A control system 44 may be connected to the loading assembly 58 for instructing the loading assembly 58 to move the luggage item 20 from the entrance conveyor 56 onto one of the shelves 24 of the container 22. The control system 44 may also be wirelessly connected to the carrier automatic guided vehicle 34 for controlling the movement of the carrier automatic guided vehicle 34 along the first pathway 46 between the loading area 42 and the first predetermined area 50.

According to an aspect and as shown in FIG. 2, one or more of the shelves 24 of the containers 22 may include a pair of opposite sides 60 and the loading assembly 58 may be configured to move the luggage item 20 onto one of the shelves 24 of the container 22 with the loading assembly 58 adjacent to either of the opposite sides 60.

Figure 4A:
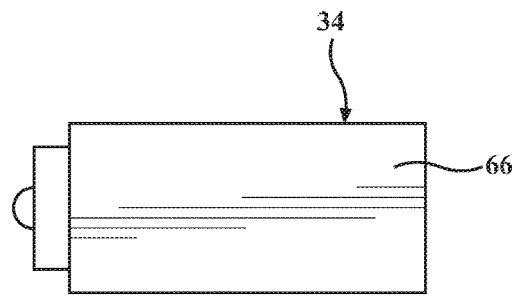
FIG. 4A is a top view of a carrier automatic guided vehicle in accordance with an aspect of the disclosure.
Figure 4B:
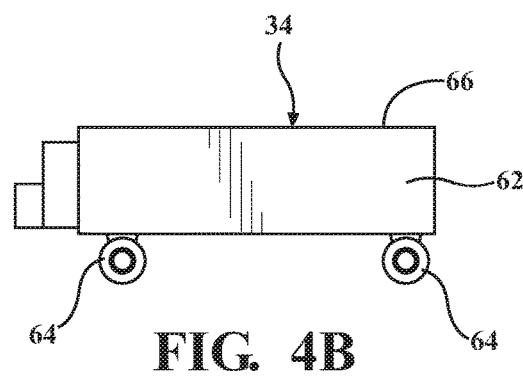
FIG. 4B is a side view of the carrier automatic guided vehicle of FIG. 4A.
Figure 4C:
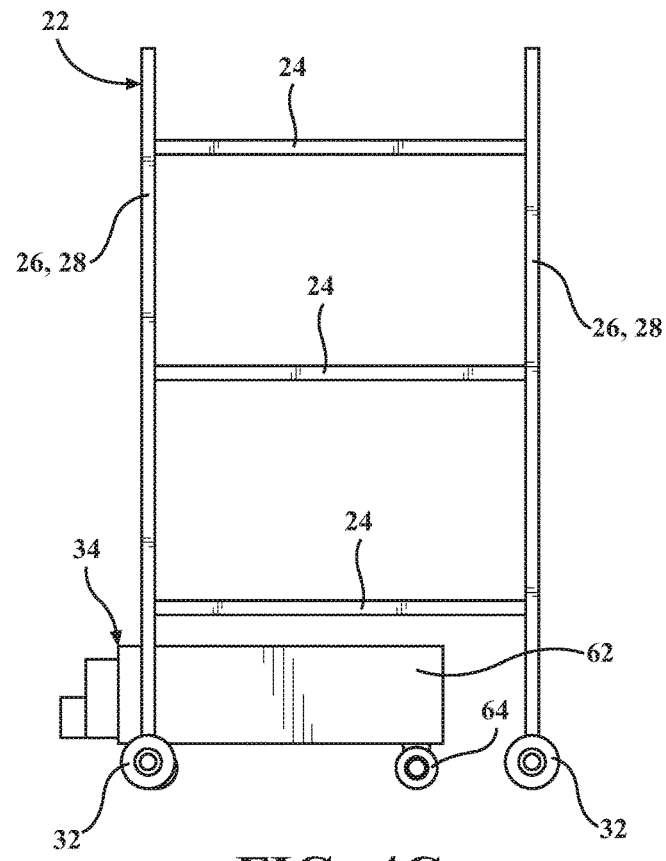
FIG. 4C is a side view of the carrier automatic guided vehicle of FIG. 4A in position under a container.

As best shown in FIG. 4A-4C, the carrier automatic guided vehicles 34 each include a second chassis 62, a plurality of second wheels 64 that are connected to the second chassis 62 for establishing rolling movement of the carrier automatic guided vehicle 34, and a support surface 66 disposed on the second chassis 62 for removably supporting one of the containers 22. The support surface 66 may, for example, engage and lift the container 22 vertically to support the container 22 off of the ground. It should be appreciated that other configurations of the carrier automatic guided vehicles 34 could be utilized. For example, the carrier automatic guided vehicles 34 could be configured to push or pull the containers 22 rather than carry the containers 22.

According to an aspect and as shown in FIGS. 6A, 6B, 6C and 7, the system may also include a transport vehicle 68 configured to move a plurality of containers 22 together. As shown in the Figures, the transport vehicle 68 may lift and move the plurality of containers 22 in a first direction 70 with the containers 22 being adjacent and aligned with one another in the first direction 70. It should be appreciated that other configurations of the transport vehicle 68 could be utilized. For example, the transport vehicle 68 could be configured to push or pull the containers 22 rather than carry the containers 22.

Figure 8A:
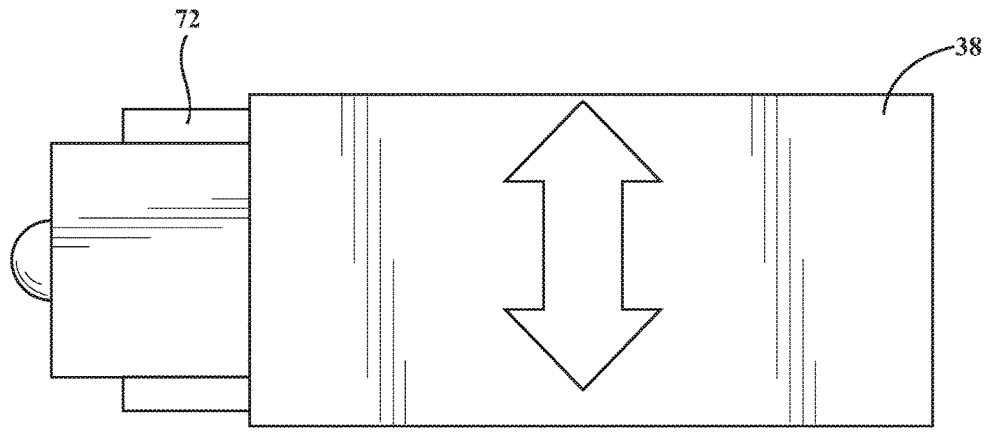
FIG. 8A is a top view of a packing automatic guided vehicle in accordance with an aspect of the disclosure.
Figure 8B:
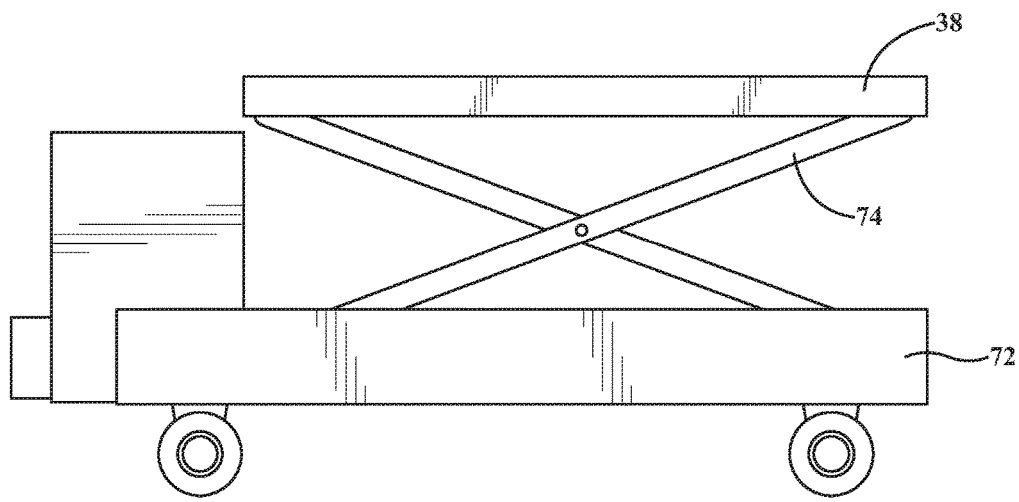
FIG. 8B is a side view of the packing automatic guided vehicle of FIG. 8A.

According to an aspect shown in FIGS. 8A, 8B, 9 and 10, the loading assembly 58 may include a packing automatic guided vehicle 36 having a fourth chassis 72 and a first transfer device 38 supported by the fourth chassis 72 for holding a luggage item 20 and for moving the luggage item 20 onto a shelf 24 of the container 22; the packing automatic guided vehicle 36 may also include a lifting mechanism 74 interconnecting the fourth chassis 72 and the first transfer device 38 and providing vertical movement of the first transfer device 38 relative to the fourth chassis 72 for aligning the first transfer device 38 with one of the shelves 24 of the container 22. As shown in FIG. 8B, the lifting mechanism 74 may include, for example, a scissor mechanism. The first transfer device 38 may include, for example, a belt conveyor, a roller conveyor, or a pusher device.

Figure 9:
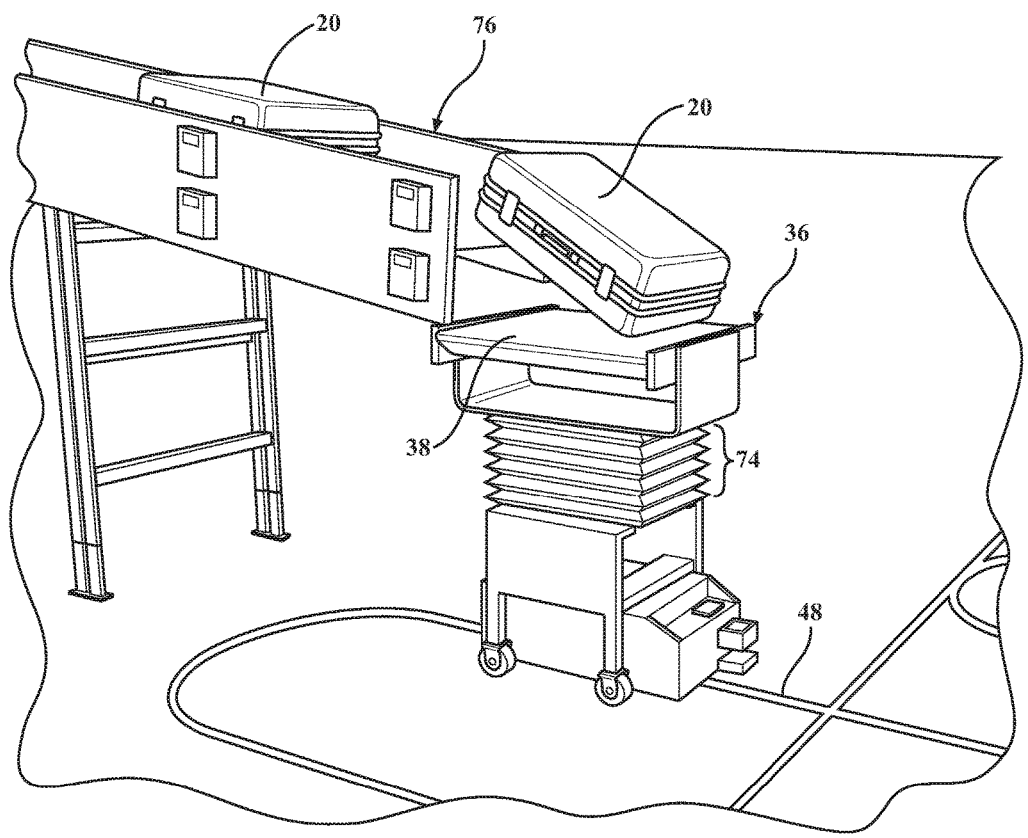
FIG. 9 is a perspective view of a luggage item being placed upon a packing automatic guided vehicle by an over-the-top conveyor in accordance with an aspect of the disclosure.
Figure 10:
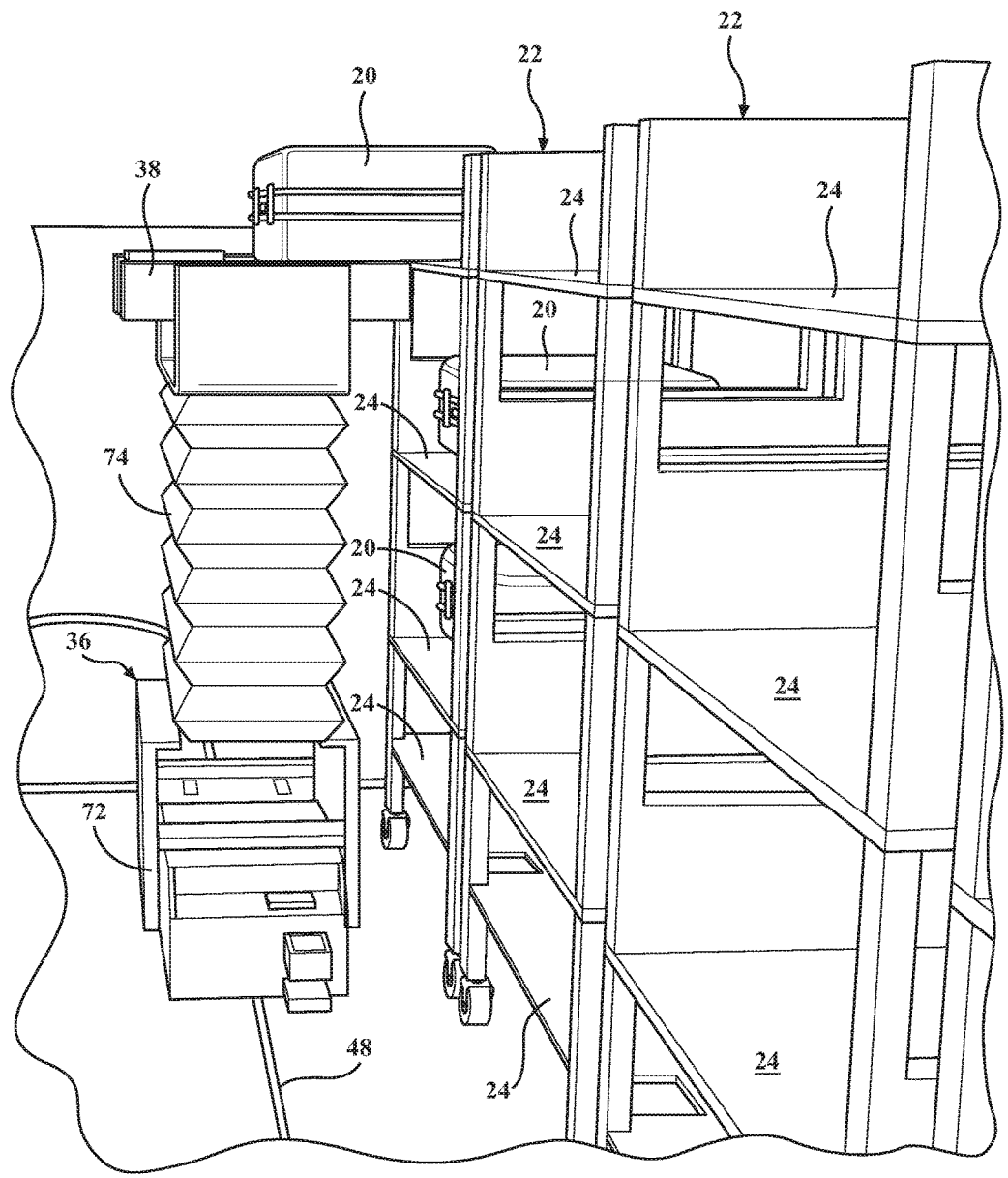
FIG. 10 is a is a perspective view of a luggage item being placed upon a shelf of a container by a packing automatic guided vehicle in accordance with an aspect of the disclosure.

The packing automatic guided vehicle 36 may further include a coupling means for releasably coupling the packing automatic guided vehicle 36 with the container 22 to prevent relative motion therebetween. The coupling means may, for example, take the form of a pin or latch. As shown in FIG. 9, a luggage item 20 may be transferred from the entrance conveyor 56 and onto to the packing automatic guided vehicle 36 using an over-the-top style loading conveyor 76.

Figure 11:
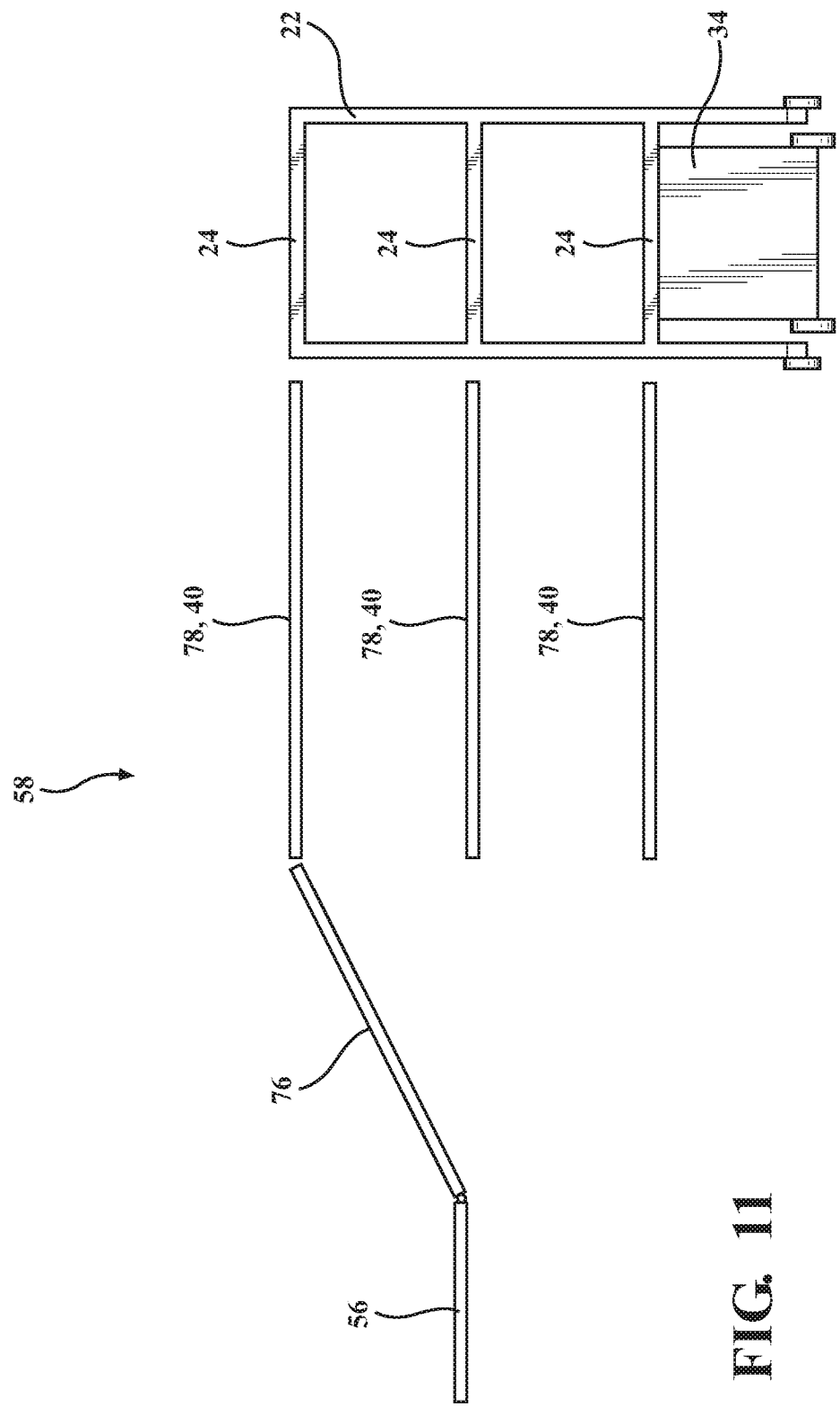
FIG. 11 is a cut-away side view of a loading assembly in accordance with another aspect of the disclosure that includes a loading conveyor and three platform conveyors stacked on top of one another and each at the same height of a corresponding shelf of a container.
Figure 12:
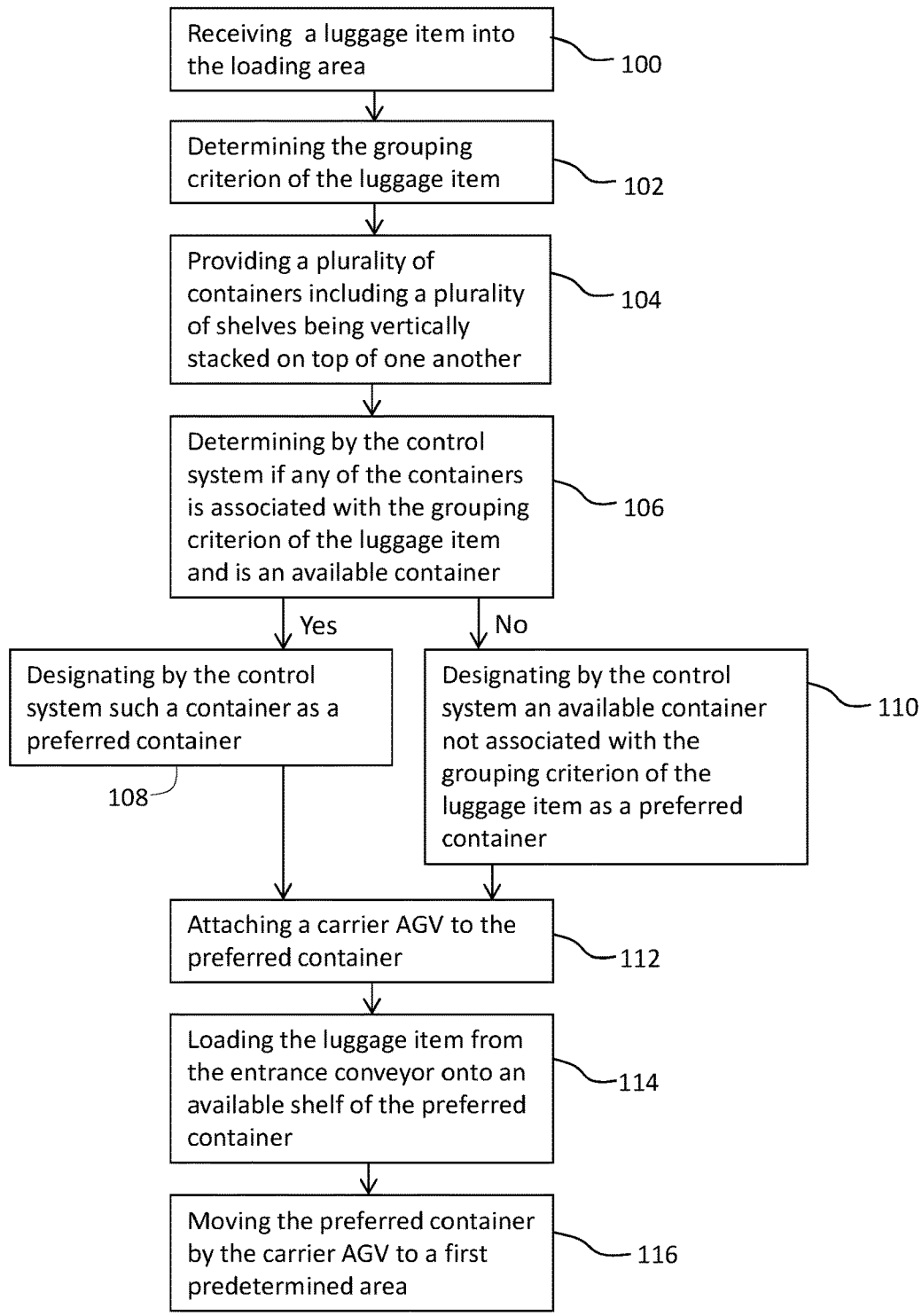
FIG. 12 is a flow diagram of an example method for sorting and sequencing luggage items according to an aspect of the disclosure.

According to another aspect and as shown in FIG. 11, the loading assembly 58 may include a plurality of platform conveyors 78 disposed in vertically stacked relationship with one another with each of the platform conveyors 78 disposed at the same height as a corresponding one of the shelves 24 of the container 22. The loading assembly 58 may further include a loading conveyor 76 extending from the entrance conveyor 56 and pivotable relative to the entrance conveyor 56 for alignment with one of the platform conveyors 78 for moving the luggage item 20 from the entrance conveyor 56 onto one of the platform conveyors 78. A plurality of second transfer devices 40 each associated with a corresponding one of the platform conveyors 78 may move the luggage item 20 from the platform conveyor 78 onto the corresponding one of the shelves 24 of the container 22. The second transfer devices 40 may include, for example, a belt conveyor, a roller conveyor, or a pusher device.

A method for storing and sequencing a plurality of luggage items 20 having an associated grouping criterion is also provided. The method includes 100 receiving at least one of the luggage items 20 into a loading area 42 from an entrance conveyor 56; 102 determining the grouping criterion of the luggage item 20 by the control system 44; and 104 providing a plurality of containers 22 each including a plurality of shelves 24 vertically stacked on top of one another. The method also includes steps for sorting the luggage items 20 by 106 determining by the control system 44 if any of the containers 22 is associated with the grouping criterion of the luggage item 20 and is an available container 22 being in a location proximate to the loading area 42 and having at least one available shelf with capacity to hold the luggage item 20, and 108 designating by the control system 44 such a container 22 as a preferred container 22, and if no such container 22 exists then 110 designating by the control system 44 an available container 22 not associated with the grouping criterion of the luggage item 20 as a preferred container 22. The method may include associating the container 22 by the control system 44 with the grouping criterion of the luggage item 20. The method further includes the step of 112 attaching a carrier automatic guided vehicle 34 to the preferred container 22. The method proceeds with the steps of 114 loading the luggage item 20 from the entrance conveyor 56 onto an available shelf of the preferred container 22; and 116 moving the container 22 with the luggage item 20 by the carrier automatic guided vehicle 34 to a first predetermined area 50. The step of 116 moving the container 22 with the luggage item 20 by the carrier automatic guided vehicle 34 to a first predetermined area 50 may be performed after the control system 44 determines that all of the shelves 24 of that container 22 are loaded with luggage items 20. The control system 44 may also initiate step of 116 moving the container 22 with the luggage item 20 by the carrier automatic guided vehicle 34 to a first predetermined area 50 as a result of the occurrence of a transfer criteria such as, for example, if the flight associated with that grouping criteria is scheduled for final loading before takeoff or the expiration of a holding criteria, such as, for example, if a predetermined period of time has elapsed since any luggage items 20 associated with a group of travelers traveling on a shared reservation have entered the system.

According to an aspect of the invention, the method may also include the step of moving the container 22 with the luggage item 20 to a second predetermined area 52. For example, luggage items 20 which are grouped according to a common flight which is not scheduled for departure until some distant time in the future may be initially sent to first predetermined area 50 which is a storage area, and at the desired time for further processing, such as loading onto the common flight, the container 22 with the luggage item 20 may then be moved to the second predetermined area 52 which may be a loading area 42 for moving the luggage item 20 onto the common flight. As discussed above, the method steps may be performed in an order different than the order described herein.

According to an aspect of the invention, the containers 22 may include first wheels 32 and the method may include the step of moving the container 22 manually and without a carrier automatic guided vehicle 34 being attached to the container 22. This may be advantageous if one or more luggage items 20 require special processing outside of the normal automated process. This manual movement of the containers 22 may also allow them to be manually moved throughout a facility including areas where an automatic guided vehicle is not suitable, for example, in elevators, in passenger concourses, etc. and may be used by passengers or by airport or security personnel for baggage storage, transit, pickup or drop-off. For example, in cases where additional baggage claim capacity is required, such as for large events or peak travel seasons, containers 22 may be provided in a designated area, such as for passenger drop-off or pickup of luggage items 20. This may allow for an airport to accommodate those cases requiring additional baggage claim capacity without requiring expensive permanent infrastructure, such as extra claim belt conveyors which would remain unused most of the time.

According to an aspect of the invention, the shelves 24 may each have two opposite sides 60, and the method may include the step of loading the luggage item 20 onto an available shelf of the preferred container 22 further includes loading the luggage item 20 onto the available shelf of the preferred container 22 from either one of the two opposite sides 60.

The method step of loading the luggage item 20 onto an available shelf of the preferred container 22 may include moving the luggage manually onto an available shelf of the preferred container 22.

According to one embodiment, the method may also include the use of a loading assembly 58 with a packing automatic guided vehicle 36 having a fourth chassis 72, a first transfer device 38, and a lifting mechanism 74 interconnecting the fourth chassis 72 and the first transfer device 38 and providing vertical movement of the first transfer device 38 relative to the fourth chassis 72. In using the packing automatic guided vehicle 36, the method step of loading the luggage item 20 onto an available shelf of the preferred container 22 may include moving the luggage item 20 from the entrance conveyor 56 onto the first transfer device 38 of the packing automatic guided vehicle 36. As shown in FIG. 9, the step of loading the luggage item 20 onto to the packing automatic guided vehicle 36 may be performed by an over-the-top style loading conveyor 76.

The method may proceed with the step of moving the packing automatic guided vehicle 36 along a second pathway 48 to a position adjacent to the preferred container 22. As shown in FIG. 2, this position adjacent may include the preferred container 22 being located at a designated handoff location 54. The method may further include moving the first transfer device 38 into vertical alignment with a selected one of the shelves 24 of the container 22 with the lifting mechanism 74; and moving the luggage item 20 from the packing automatic guided vehicle 36 onto the selected shelf 24 of the preferred container 22 with the first transfer device 38. The method may also include the step of coupling the packing automatic guided vehicle 36 with the preferred container 22 to prevent relative motion therebetween prior to moving the luggage item 20 from the packing automatic guided vehicle 36 onto the selected shelf 24 of the preferred container 22 with the first transfer device 38.

According to another embodiment, the method may include using a loading assembly 58 having a plurality of platform conveyors 78 disposed in a vertically stacked relationship with one another with each of the platform conveyors 78 disposed at the same height as one of the shelves 24 of the container 22, a loading conveyor 76 extending from the entrance conveyor 56 and pivotable relative to the entrance conveyor 56 for alignment with each of the platform conveyors 78, and a plurality of second transfer devices 40 each disposed at the same height as a corresponding one of the platform conveyors 78. In using the platform conveyors 78, the method step of loading the luggage item 20 onto an available shelf of the preferred container 22 may include pivoting the loading conveyor 76 into alignment with a platform conveyor 78 corresponding to the available shelf; moving the luggage item 20 from the entrance conveyor 56 to the selected one of the platform conveyors 78 with the loading conveyor 76; and moving the luggage item 20 from the selected one of the platform conveyors 78 onto the available shelf of the preferred container 22 with the second transfer device 40.

According to an aspect of the invention, the grouping criterion may be based upon the luggage items 20 belonging to one or more passengers traveling together with a shared reservation.

According to another aspect of the invention, the grouping criterion may be based upon processing requirements of the luggage items 20. Several examples of processing requirements of the luggage items 20 are described in more detail below.

According to another aspect of the invention, the processing requirements of the luggage items 20 include a security inspection or a customs inspection. For example, all luggage designated for a security or customs inspection, which may depend on the destination region or country, may be grouped together to all be moved to the associated inspections area.

According to another aspect of the invention, the processing requirements of the luggage items 20 include the luggage items 20 being associated with a common departure time window. For example, all luggage designated for departures more than hours in the future may be grouped together to be sent to a long-term storage area. As another example, all luggage designated for departure times less than a predetermined period of time may be flagged for priority processing and may have an associated grouping criterion set that allows for those luggage items 20 to be processed with minimal delays to increase the chances of the luggage items 20 making it on the associated aircraft.

According to another aspect of the invention, the processing requirements of the luggage items 20 include the luggage items 20 being associated with a first transportation means having a common destination; and the common destination being a final destination and the luggage items 20 being designated to be made available for claim at the common destination. In other words, not being designated for transfer by the conveyance company to a second transportation means such as a connecting flight. This type of grouping may simplify processing at the common destination by allowing, for example, all of the luggage items 20 designated for claim at the common destination to be placed in one or more cargo crates which may be sent directly to a claims area without the need for separating out luggage items 20 bound for connecting flights upon arrival at the common destination.

According to another aspect of the invention, the processing requirements of the luggage items 20 include the luggage items 20 being associated with a first transportation means having a common first destination; and the luggage items 20 being designated for transfer to a second transportation means upon arrival at the common first destination. This aspect is similar to the aspect described above and may also provide a similar benefit of simplified processing at the common first destination. As an example, this type of grouping may provide for all of the luggage items 20 designated for transfer to another flight at the common destination to be placed in one or more cargo containers 22 which may be sent directly to a transfer sorting area without the need for separating out luggage items 20 bound for passenger claim upon arrival at the common first destination.

According to another aspect of the invention, the processing requirements of the luggage items 20 also include the luggage items 20 being designated for a common intermediate destination following the common first destination. Like the example above, processing of the luggage items 20 at the common first destination may be simplified by having all of the luggage items 20 which are bound for a common intermediate destination being grouped together. By being grouped together, the luggage items 20 bound for a common intermediate destination may be transferred as a single group to the flight bound for that intermediate destination. This transfer together may eliminate the step of processing those individual luggage items 20 at the common intermediate destination.

According to a further aspect of the invention, the processing requirements of the luggage items 20 may also include the luggage items 20 being designated for a common final destination following the common first destination. Similar to the examples above, the luggage items 20 above may be grouped and processed together through any number of intermediate steps without needing to process the individual luggage items 20 all the way through to the common final destination where that group of luggage items 20 may be transferred together to a baggage claim area for passenger pickup.

Figure 6A:
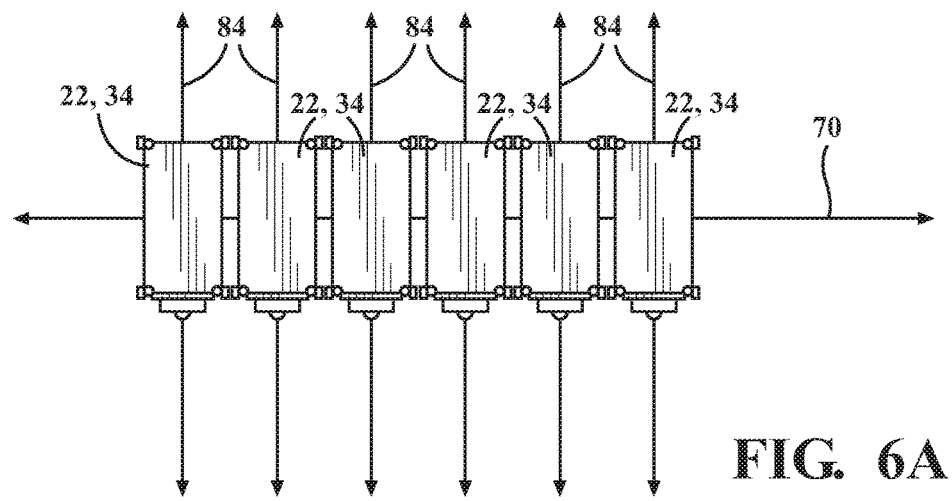
FIG. 6A is a top view of a plurality of adjacent and aligned containers with one another in the first direction and with a carrier automatic guided vehicle disposed below each container.
Figure 6B:
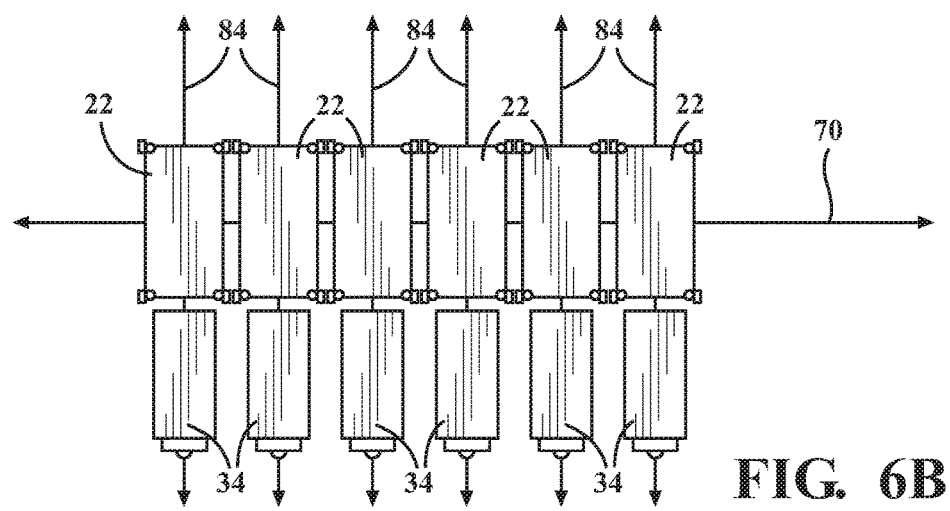
FIG. 6B is the top view FIG. 6A with the carrier automatic guided vehicles moved away from the adjacent and aligned containers in a second direction.
Figure 6C:
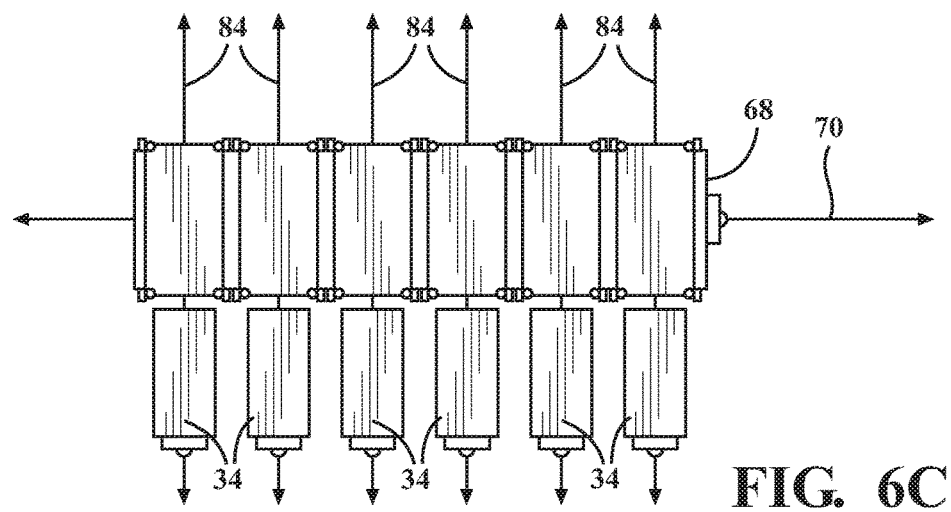
FIG. 6C is the top view FIG. 6A with a transport vehicle disposed below the adjacent and aligned containers.
Figure 7:
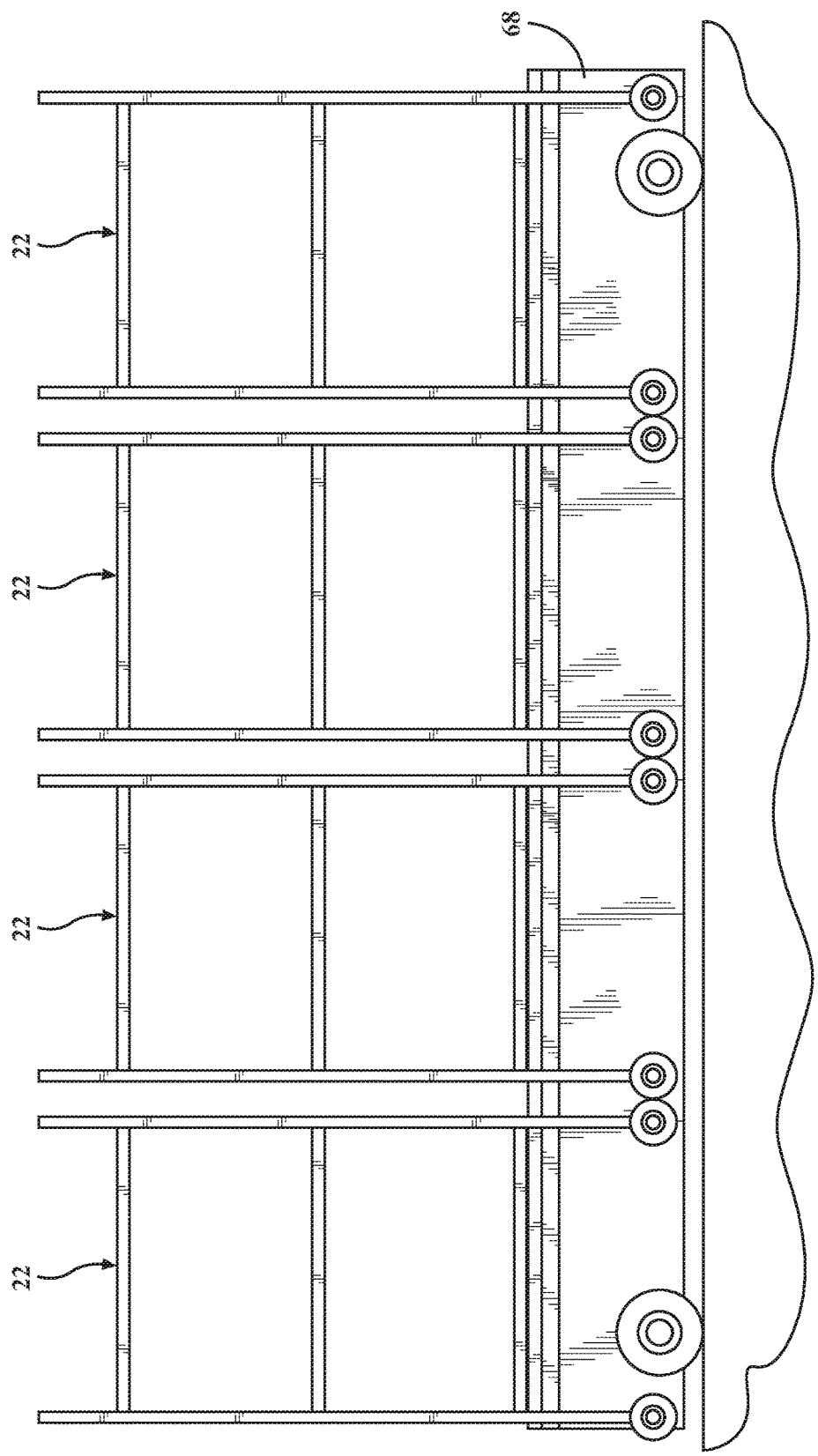
FIG. 7 is a side view of FIG. 6C, with the transport vehicle disposed below the adjacent and aligned containers.

As best shown in FIGS. 6A, 6B and 6C, the method may also include steps for moving a plurality of containers 22 together by a transport vehicle 68. Those steps may include: moving one of the containers 22 with a carrier automatic guided vehicle 34 adjacent to another one of the containers 22 such that the containers 22 are aligned in a first direction 70 as adjacent and aligned containers 22; disengaging the carrier automatic guided vehicle 34 from the one of the containers 22 and moving the carrier automatic guided vehicle 34 free of the one of the containers 22 in a second direction 84 transverse to the first direction 70. The method may conclude with the steps of engaging the adjacent and aligned containers 22 with a transport vehicle 68 and moving the adjacent and aligned containers 22 together with the transport vehicle 68 in the first direction 70. In the example shown in FIGS. 6A, 6B and 6C, the transport vehicle 68 is an automatic guided vehicle which lifts to support the adjacent and aligned containers 22 similar to the way that the carrier automatic guided vehicles 34 may move each container 22 individually.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A method for storing and sequencing a plurality of luggage items, said method comprising:
   receiving a luggage item into a loading area from an entrance conveyor;
   determining a grouping criterion of the luggage item;
   providing a plurality of containers each including a plurality of shelves being vertically stacked on top of one another and supported by a first chassis;
   determining by a control system if any container within the plurality of containers is associated with the grouping criterion of the luggage item and is an available container being in a location proximate to said loading area and having at least one available shelf with capacity to hold the luggage item;
   designating by the control system an available container that is associated with the grouping criterion of the luggage item as a preferred container;
   designating by the control system an available container not associated with the grouping criterion of the luggage item as the preferred container if no container of the plurality of containers is determined to be both an available container and associated with the grouping criterion of the luggage item;
   attaching a carrier automatic guided vehicle to the preferred container;
   loading the luggage item from the entrance conveyor onto an available shelf of the preferred container; and
   moving the container with the luggage item by the carrier automatic guided vehicle along a first pathway to a first predetermined area.

2. The method as set forth in claim 1 further including the step of moving the container with the luggage item to a second predetermined area.

3. The method as set forth in claim 1 wherein the container includes first wheels; and
   the method further includes the step of moving the container manually and without a carrier automatic guided vehicle being attached to the container.

4. The method as set forth in claim 1 wherein the shelves each have two opposite sides, and wherein the step of loading the luggage item onto an available shelf of the preferred container further includes:
   loading the luggage item onto the available shelf of the preferred container from either one of the two opposite sides.

5. The method as set forth in claim 1 wherein the step of loading the luggage item onto an available shelf of the preferred container further includes:
   moving the luggage manually onto an available shelf of the preferred container.

6. The method as set forth in claim 1 further including a loading assembly that includes a packing automatic guided vehicle having a fourth chassis, a first transfer device, and a lifting mechanism interconnecting the fourth chassis and the first transfer device and providing movement of the first transfer device relative to the fourth chassis;

wherein the step of loading the luggage item onto an available shelf of the preferred container further includes:

moving the luggage item from the entrance conveyor onto the first transfer device of the packing automatic guided vehicle;

moving the packing automatic guided vehicle along a second pathway and adjacent to the preferred container;

moving the first transfer device into alignment with a selected one of the shelves of the container with the lifting mechanism; and moving the luggage item from the packing automatic guided vehicle onto the selected shelf of the preferred container with the first transfer device.

7. The method as set forth in claim 6 wherein the method further includes the step of coupling the packing automatic guided vehicle with the preferred container to prevent relative motion therebetween prior to moving the luggage item from the packing automatic guided vehicle onto the selected shelf of the preferred container with the first transfer device.

8. The method as set forth in claim 1 further including a loading assembly including a plurality of platform conveyors disposed in a vertically stacked relationship with one another with each of the platform conveyors disposed at the same height as one of the shelves of the container, a loading conveyor extending from the entrance conveyor and pivotable relative to the entrance conveyor for alignment with each of the platform conveyors, and a plurality of second transfer devices each disposed at the same height as a corresponding one of the platform conveyors;

wherein the step of loading the luggage item onto an available shelf of the preferred container further includes:

pivoting the loading conveyor into alignment with a selected one of the platform conveyors corresponding to the available shelf;

moving the luggage item from the entrance conveyor to the selected one of the platform conveyors with the loading conveyor; and moving the luggage item from the selected one of the platform conveyors onto the available shelf of the preferred container with the second transfer device.

9. The method as set forth in claim 1 wherein the grouping criterion is based upon the luggage items belonging to one or more passengers traveling together with a shared reservation.

10. The method as set forth in claim 1 wherein the grouping criterion is based upon processing requirements of the luggage items.

11. The method as set forth in claim 10 wherein the processing requirements of the luggage items include a security inspection or a customs inspection.

12. The method as set forth in claim 10 wherein the processing requirements of the luggage items include the luggage items being associated with a common departure time window.

13. The method as set forth in claim 10 wherein the processing requirements of the luggage items include the luggage items being associated with a first transportation means having a common destination; and the common destination being a final destination and the luggage items being designated to be made available for claim at the common destination and not being designated for transfer to a second transportation means.

14. The method as set forth in claim 10 wherein the processing requirements of the luggage items include the luggage items being associated with a first transportation means having a common first destination; and the luggage items being designated for transfer to a second transportation means upon arrival at the common first destination.

15. The method as set forth in claim 14 wherein the processing requirements of the luggage items also include the luggage items being designated for a common intermediate destination following said common first destination.

16. The method as set forth in claim 14 wherein the processing requirements of the luggage items also include the luggage items being designated for a common final destination following said common first destination.

17. The method as set forth in claim 1 wherein the method further includes the step of moving a plurality of containers together by a transport vehicle.

18. The method as set forth in claim 17 further including the steps of moving one of the containers with a carrier automatic guided vehicle adjacent to another one of the containers such that the containers are aligned in a first direction as adjacent and aligned containers;

disengaging the carrier automatic guided vehicle from the one of the containers and moving the carrier automatic guided vehicle free of the one of the containers in a second direction transverse to the first direction; and engaging the adjacent and aligned containers with a transport vehicle and moving the adjacent and aligned containers together with the transport vehicle in the first direction.

19. A system for storing and sequencing a plurality of luggage items having an associated grouping criterion, said system including:

at least one container including a plurality of shelves being vertically stacked on top of one another;

a loading area including an entrance conveyor for receiving the luggage items into said loading area;

a first predetermined area spaced apart from the loading area;

at least one first pathway extending between said loading area and said first predetermined area;

at least one carrier automatic guided vehicle releasably attachable to said container for transporting said container between said loading area and said first predetermined area;

a loading assembly disposed in said loading area and configured to move the luggage item from said entrance conveyor onto one of said shelves of said container;

a control system connected to said loading assembly for instructing said loading assembly to move the luggage item from said entrance conveyor onto one of said shelves of said container;

said control system wirelessly connected to said carrier automatic guided vehicle for controlling the movement of said carrier automatic guided vehicle along said first pathway between said loading area and said first predetermined area;

wherein said control system is configured to determine if the at least one container is associated with the grouping criterion of the luggage item;

wherein said control system is configured to determine if the at least one container is an available container being in a location proximate to said loading area and having at least one available shelf with capacity to hold the luggage item;

wherein said control system is configured to designate an available container that is associated with the grouping criterion of the luggage item as a preferred container; and wherein said control system is configured to designate an available container not associated with the grouping criterion of the luggage item as the preferred container if no containers of the plurality of containers are determined to be both an available container and associated with the grouping criterion of the luggage item.

20. The system as set forth in claim 19 wherein the container further includes a plurality of first wheels and is configured to be manually moved without an automatic guided vehicle attached thereto.

21. The system as set forth in claim 19 wherein each of said shelves of said container further includes a pair of opposite sides and said loading assembly is configured to move the luggage item onto one of said shelves of said container with the loading assembly adjacent to either of the opposite sides.

22. The system as set forth in claim 19 further including a transport vehicle configured to move a plurality of containers together.

23. A system for storing and sequencing a plurality of luggage items having an associated grouping criterion, said system including:
    at least one container including a plurality of shelves being vertically stacked on top of one another;
    a loading area including an entrance conveyor for receiving the luggage items into said loading area;
    a first predetermined area spaced apart from the loading area;
    at least one first pathway extending between said loading area and said first predetermined area;
    at least one carrier automatic guided vehicle releasably attachable to said container for transporting said container between said loading area and said first predetermined area;
    a loading assembly disposed in said loading area and configured to move the luggage item from said entrance conveyor onto one of said shelves of said container;
    a control system connected to said loading assembly for instructing said loading assembly to move the luggage item from said entrance conveyor onto one of said shelves of said container;
    said control system wirelessly connected to said carrier automatic guided vehicle for controlling the movement of said carrier automatic guided vehicle along said first pathway between said loading area and said first predetermined area;
    wherein said loading assembly includes a packing automatic guided vehicle having a fourth chassis and a first transfer device supported by said fourth chassis for holding a luggage item and for moving said luggage item onto one of said shelves of said container;
    said packing automatic guided vehicle further including a lifting mechanism interconnecting said fourth chassis and said first transfer device and providing movement of said first transfer device relative to said fourth chassis for aligning said first transfer device with one of said shelves of said container; and
    said first transfer device being moveable for moving the luggage item from said first transfer device onto said shelf of said container.

24. The system as set forth in claim 23 wherein said packing automatic guided vehicle further includes a coupling means for releasably coupling the packing automatic guided vehicle with the container to prevent relative motion therebetween.

25. The system as set forth in claim 19 wherein said loading assembly includes a plurality of platform conveyors disposed in vertically stacked relationship with one another with each of said platform conveyors disposed at the same height as a corresponding one of said shelves of said container; and
    said loading assembly further including a loading conveyor extending from said entrance conveyor and pivotable relative to said entrance conveyor for being aligned with one of said platform conveyors for moving the luggage item from said entrance conveyor onto one of said platform conveyors, and a plurality of second transfer devices each associated with a corresponding one of said platform conveyors for moving the luggage item onto said corresponding one of said shelves.

* * * * *